No. 820,342. PATENTED MAY 8, 1906.
H. BESSER.
CULVERT CONSTRUCTION.
APPLICATION FILED MAY 4, 1905.
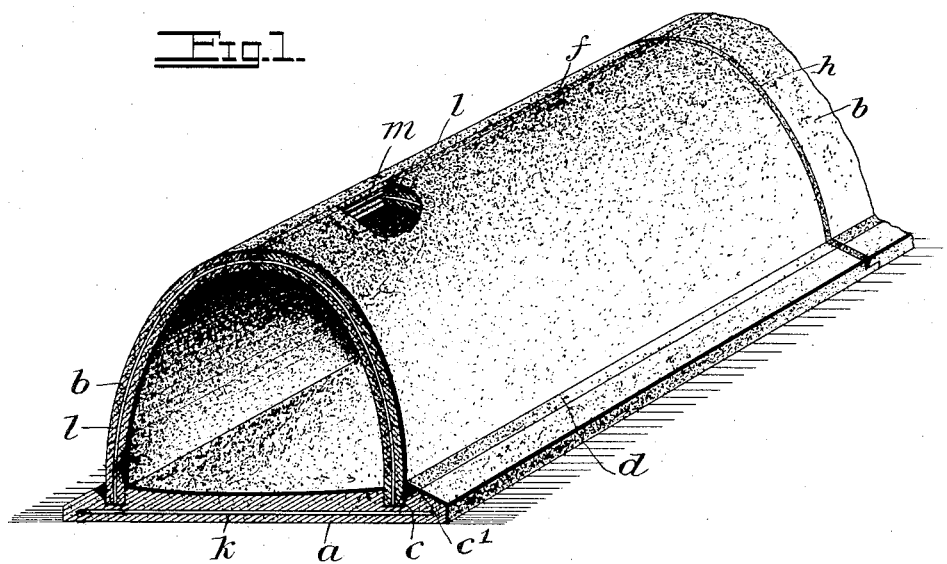
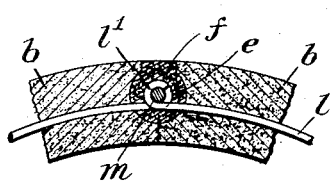
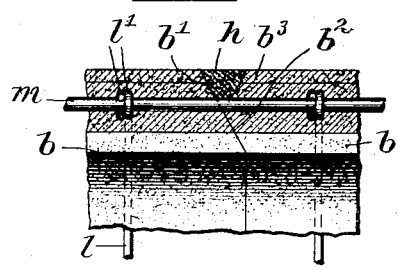
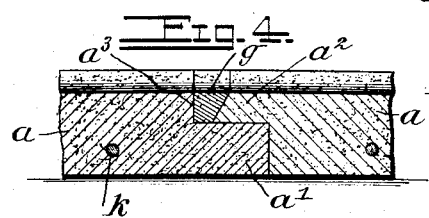
WITNESSES:
INVENTOR
Herman Besser
BY
ATTORNEYS

UNITED STATES PATENT OFFICE.

HERMAN BESSER, OF ALPENA, MICHIGAN.

CULVERT CONSTRUCTION.

No. 820,342.  Specification of Letters Patent.  Patented May 8, 1906.

Application filed May 4, 1905. Serial No. 258,768.

*To all whom it may concern:*

Be it known that I, HERMAN BESSER, a citizen of the United States, and a resident of Alpena, in the county of Alpena and State of Michigan, have invented a new and Improved Culvert Construction, of which the following is a full, clear, and exact description.

My invention relates to certain improvements in constructions for sewer-pipes and culverts, and the principal objects thereof are to provide means whereby such constructions can be laid in place after being manufactured elsewhere without necessitating the handling of the heavy sections which are now usually employed; furthermore, to provide means for strengthening constructions of this character and to provide for forming joints which will be capable of being made tight and which will be of such a nature that pressure upon their exterior surfaces will not operate to loosen them.

Further objects of the invention will appear in the course of the subjoined description.

Reference is to be had to the accompanying drawings, forming a part of this specification, in which similar characters of reference indicate corresponding parts in all the figures.

Figure 1 is a perspective view, partly broken away, of a culvert constructed in accordance with the principle of my invention. Fig. 2 is a sectional view, on an enlarged scale, of a portion thereof. Fig. 3 is a longitudinal sectional view of the same on the line 3 3 of Fig. 2; and Fig. 4 is a longitudinal sectional view, on an enlarged scale, showing the method of joining the ends of the blocks used to form the device.

The culvert is preferably formed with a base $a$ and two side pieces $b$. The base is provided with longitudinal grooves $c$, in which rest the side pieces. These grooves are provided with inclined extensions $c'$, located upon the outside of the side pieces when in place and adapted to be filled with mortar $d$ to form a joint along the bottom of the side pieces. The side pieces are of such form that when two of them are brought together they constitute an arch, closing over the top of the bottom piece. Each of the side pieces is formed with a groove $e$, and the grooves of two of them, when they are assembled in proper position, together constitute a receptacle $f$ for mortar to bind the side pieces together. Both the grooves $c'$ and $e$ are open-topped, and consequently when the mortar is placed in them to form joints for sealing the parts together, it will be understood that any pressure applied upon the outside only serves to force the mortar farther into the groove, and consequently does not act to loosen the joint. Below the grooves $c$ are projections $c^2$ constituting the bottoms of these grooves, the two projections abutting against each other and so serving to assist in holding the two sections in proper position. A sewer construction built in this manner is usually formed of a series of lengths placed end to end, and these lengths are joined together in the manner shown in Figs. 3 and 4. The bottom pieces are provided with complementary extensions $a'$ and $a^2$, the latter being shorter than the former, so as to leave a groove $a^3$ for the reception of a mortar-joint $g$. The side pieces are provided with inclined faces $b'$ and $b^2$, which are complementary to each other, and the last-mentioned one is cut off at $b^3$, so as to form a groove for the reception of a mortar-joint $h$. These mortar-joints $g$ and $h$ are open-topped and substantially wedge-shaped like the others, so that pressure applied upon their outer surface will act in the manner described above. It will be understood that the invention is not limited to any particular kind of plastic material for use in forming the joints, as any ordinary material used for that purpose can be employed.

The bottom piece $a$ is preferably provided with a strengthening-bar or series of bars $k$, and each of the side pieces is also provided with a series of strengthening-rods $l$. The latter rods extend upwardly into the grooves $e$ and are provided with curved projections $l'$, those on one side being bent in one direction and those on the other side in the other direction, so that when placed together they overlap and afford a space between them for a longitudinal strengthening-bar $m$, which passes through the joint $f$ and also secures the bars $l$ together in an efficient manner. These strengthening-pieces are placed in the mold and molded in the plastic material of which the blocks are made during the process of manufacture; but the rod $m$ is of course placed in position when the parts are assembled, and after this is done the plastic material for forming the joint is applied to secure it in stationary position.

By constructing the parts in accordance with the principle of my invention, whether in the form shown in the drawings or not, it will be seen that the several elements of the three-piece sewer-pipe can be manufactured in a convenient place and can be very rapidly and easily assembled, so as to make practically a continuous piece, and that the joints can be also made so as to serve their purpose with great efficiency. This is a result that cannot be accomplished when ends of pipes are merely brought together without leaving openings to be filled with mortar or the like. This system can be used for all kinds of sewers and culverts, and is especially valuable for those over twenty inches in diameter. The parts are preferably made of cement concrete, and it will be seen that by their use the great expense of making large pipes in place, or of using a derrick to lift the solid sections, is done away with.

Having thus described my invention, I claim as new and desire to secure by Letters Patent—

1. A culvert construction comprising side pieces meeting at their upper edges and having strengthening elements embedded therein, the strengthening elements in one projecting beyond the edge thereof and overlapping a strengthening element in the other; said side pieces each being provided with a groove along its upper edge, said grooves registering with each other and constituting a receptacle for a plastic joint.

2. A culvert construction comprising side pieces meeting at their upper edges and having strengthening elements embedded therein, the strengthening elements in one projecting beyond the edge thereof and overlapping a strengthening element in the other; said side pieces each being provided with a groove along its upper edge, said grooves registering with each other and constituting a receptacle for a plastic joint; and a strengthening-bar located in said joint and engaging said projecting portions of the strengthening elements.

In testimony whereof I have signed my name to this specification in the presence of two subscribing witnesses.

HERMAN BESSER.

Witnesses:
W. A. PRINCE,
JOHN R. McHAIG.